Feb. 8, 1966    M. N. FAIRBANK    3,233,531
CAMERA SHUTTER MECHANISM
Filed July 2, 1959    2 Sheets-Sheet 1

INVENTOR.
Murry N. Fairbank
BY
Brown and Mikulka
and
Robert J. Schiller
ATTORNEYS Feb. 8, 1966     M. N. FAIRBANK     3,233,531
CAMERA SHUTTER MECHANISM Filed July 2, 1959     2 Sheets-Sheet 2

INVENTOR.
Murry N. Fairbank
BY
Brown and Mikulka
and
Robert J. Schiller
ATTORNEYS ated Feb. 8, 1966

3,233,531
CAMERA SHUTTER MECHANISM
Murry N. Fairbank, Belmont, Mass., assignor to Polaroid Corporation, Cambridge, Mass., a corporation of Delaware
Filed July 2, 1959, Ser. No. 824,491
17 Claims. (Cl. 95—10)

This invention relates to photography and more particularly to a novel shutter mechanism adaptable for photoelectric control.

A principal object of the present invention is to provide a novel shutter mechanism comprising at least one shutter element mounted for movement with respect to an exposure aperture for so covering and uncovering said aperture as to effect exposure therethrough, the exposure being a function of the magnitude of the total excursion of the shutter element, a resilient member connected to the shutter element for biasing it into covering position with respect to the exposure aperture, means for exerting an impulse for so moving said resilient member as to initiate uncovering movement of said shutter element, resilient reversing means adjustable through a plurality of positions for variably limiting the excursion of the shutter element by engagement therewith, and actuating means for initiating the operation of the impulse exerting means.

Other objects of the present invention are: to provide in such a shutter mechanism photoelectric means for establishing electrical signals in accordance with the intensity of light incident thereon, and means connected with said reversing means for moving said reversing means through said positions in accordance with said signals, thereby varying the exposure as a function of the light intensity; to provide such a novel shutter mechanism comprising a plurality of shutter blades operable substantially simultaneously to effect exposure, and a reversing means substantially simultaneously engageable by said blades; and to provide such a shutter mechanism wherein said blades are shaped for defining, in cooperation with the exposure aperture, an effective exposure aperture the area of which is a function of said magnitude of the total excursion.

Another object of the present invention is to provide a novel shutter mechanism in which the exposure effected thereby is a function of the intensity of ambient illumination, which shutter is simple, compact, relatively inexpensive, accurate and susceptible for ready modification to match various characteristics of commercially available galvanometers and photocells.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
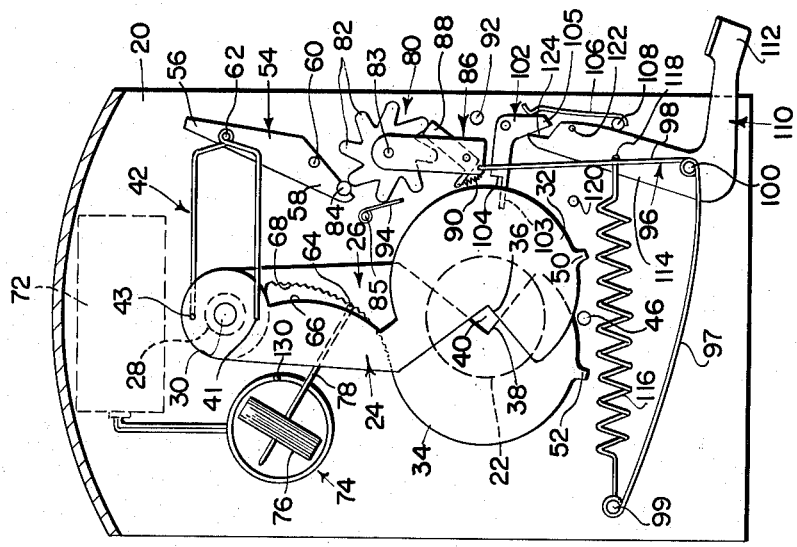
FIG. 2 is a schematic view of the embodiment of FIGURE 1 showing the elements thereof in a displaced position at the beginning of exposure.

Among the many different structures employed for varying the time interval of exposure provided by a shutter mechanism, the "bounce type" shutter has achieved singular commercial success because of its superior "timekeeping" qualities. A "bounce type" shutter, such as is shown for example in U.S. Patent No. 2,531,936, issued November 28, 1950 to M. N. Fairbank et al., is one characterized in having means, such as one or more shutter blades, movable through an exposure cycle wherein the blade is displaced in one direction from covering to uncovering position relative to an exposure aperture and then is returned in an opposite direction to covering position again. Resilient reversing means are included for arresting and reversing the direction of movement of the blade, thereby establishing an aperture-uncovering position. In such shutter, the exposure time interval is a function of the total distance of movement or the excursion of the blade through a complete cycle, the velocity of the blade being substantially invariant from cycle to cycle. Consequently, the exposure time interval may be readily varied by changing the position of the reversing means to increase or decrease this excursion of the blade. In shutters of this type an aperture-uncovering movement is imparted to the blade usually by an impulse means which directly contacts the blade.

The present invention contemplates a novel modification of this general type of shutter and includes aperture-covering and uncovering means, and resilient means connected with the covering means for biasing the latter into fully covering or rest position relative to an exposure aperture. Means are provided for mounting the resilient means for movement to and from a normal position wherein the covering means are biased into the rest position. An impulse-applying means is provided for momentarily engaging the mounting means so as to move the resilient means from the normal position. The resilient means therefore comprises a compliant linkage through which the impulse provided by the momentary engagement of the impulse-applying means is transmitted to the covering means for movement of the latter to effectuate exposure. The impulse-applying means, mounting means and resilient means are so constructed and arranged that the speed of movement imparted to the covering means remains substantially the same from cycle to cycle. Consequently, it is to be noted that in the invention the impulse-applying means does not directly contact the aperture-covering means, thus the aperture-covering means need not be sturdy to absorb impacts and its inertia may be kept desirably small. Movable means are provided for variably limiting the excursion or travel of the covering means from rest position to positions wherein at least a portion of the aperture is uncovered. The aperture-covering means is preferably so shaped as to define, in cooperation with the exposure aperture, an effective exposure aperture or "stop," the dimensions of which are a function of the position of the movable means.

Figure 1:
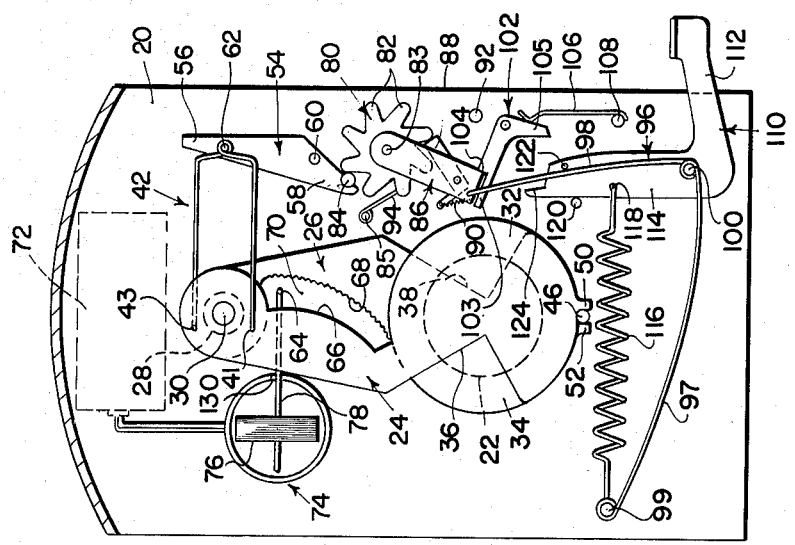
FIGURE 1 is a schematic front elevation of one embodiment of the invention showing the elements thereof in rest position.

Referring now to the various drawings wherein like numerals denote like parts, and referring particularly to FIGS. 1 and 2, one embodiment of the shutter mechanism of the present invention is shown comprising a base or support means, such as plate 20, in which an exposure aperture 22 is disposed, aperture 22 being preferably circular in shape. Covering means for effecting exposures are provided in the form of a structure comprising two elongated, substantially planar blades 24 and 26. The blades are both movably mounted, preferably for rotation about the same axis which is provided in the form of substantially friction-free mounting means, such as post 30, located adjacent the extremities of the blades furthest removed from the exposure aperture. A washer 28 may be provided between the blades at post 30 in order to so separate the blades as to allow adequate mechanical tolerance between their paths of movement. Post 30 is mounted on plate 20 and extends approximately perpendicularly therefrom, the blades being so mounted that the planes thereof are rotatable in adjacent, substantially parallel planes, preferably in opposite directions to one another. Blade 24 and blade 26 are each, respectively, provided adjacent the extremities thereof furthest removed from post 30 with aperture-covering portions 32 and 34. When in rest position, the blades are both so disposed that the aperture-covering portions extend transversely of and in covering relation to aperture 22, at least marginal sections of the aperture-covering portions being in overlapping relationship to one another.

In order to control the total exposure effected by the shutter in terms of both exposure time and aperture "stop," masking means are provided for cooperating with aperture 22 to define an aperture of variable effective exposure area. Such a masking means, in the present embodiment, is provided in the form of notches 36 and 38 disposed, respectively, in aperture-covering portions 32 and 34. Both notches are preferably so formed in a V-shape, such as a right angle, that when blades 24 and 26 are in overlapping relationship to one another the notches are disposed to frame, as shown in FIG. 2, a square opening 40 arranged preferably symmetrically about an axis perpendicular to and through the center of the plane of exposure aperture 22. Notches 36 and 38 both are preferably dimensioned so that the edges thereof may frame an opening, the maximum dimension of which is not less than the diameter of aperture 22. It is readily apparent that the notches may assume other configurations for framing openings having various other predetermined shapes.

Figure 3:
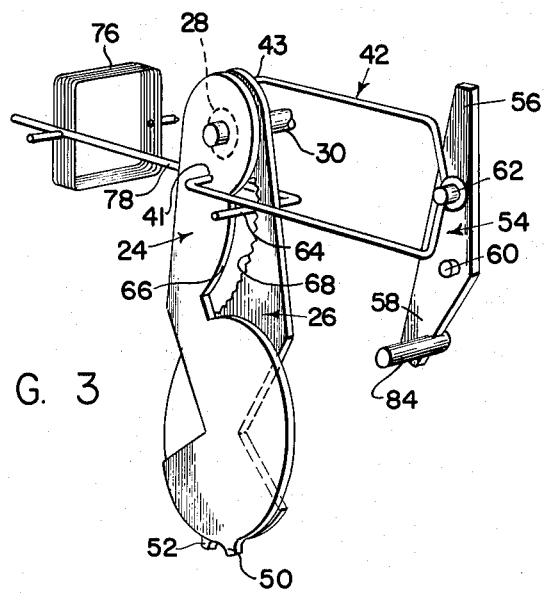
FIG. 3 is a perspective view of a portion of the embodiment of FIGURE 1 showing a fragment of the mechanism in detail.

As a means for biasing the blades into their rest position, as shown in detail in FIG. 3, there is provided a resilient means such as spring 42 which is formed in an approximate U-shape and has its extremities connected, respectively, as at points 41 and 43 to blade 24 and to blade 26. It should particularly be noted that the blades and spring 42 are so arranged with respect to one another that, when the blades are in their rest position, the extremities of the spring are tensioned for movement with respect to one another in the plane of the U-shape. In the form shown, for instance, spring 42 is so tensioned while the blades are in rest position that the extremities of the spring tend to elastically approach one another. The points 41 and 43, at which the spring is connected to the blades, are disposed at opposite sides of the pivotal axis of the blades, but do not lie upon a straight line with respect to one another and the axis. Consequently, there are formed, by virtue of the spring tension, turning moments which tend to rotate the blades in an aperture-closing direction, i.e., into the overlapping relation of their rest position. A modification of the invention may be provided wherein the spring is tensioned so that its extremities tend to elastically depart from one another, and by proper choice of points 41 and 43 with respect to the pivotal axis of the blades, such elastic departure may be used to bias the blades for movement toward one another.

As a means for limiting the rotation of the blades in aperture-closing direction under the bias of spring 42, there is provided a limit pin or post 46 which is mounted upon plate 20 and extends approximately perpendicularly therefrom. Blades 24 and 26, respectively, are provided with engagement portions, such as tabs 50 and 52, formed as extensions of the respective aperture-covering portions of the blades. Post 46 is so located in the path of movement of the tabs as to be releasably engageable therewith when the blades are in rest position.

In the embodiment shown in FIGURE 1, the overlapping relationship of the blades as determined by the arrangement of the tabs and post 46 is such that no opening 40 is framed by notches 36 and 38, thereby effectively preventing any light from passing through exposure aperture 22 until the shutter blades are moved. As the blades are rotated in aperture-uncovering direction from their rest position, an opening 40 will be formed by the combination of the edges of the notches after the blades have each moved through a predetermined arc, the opening increasing in size thereafter as the arcs of travel of the blades increase. Therefore, the degree of arc through which the blades must move before opening 40 is framed by the notches may be established by the location of the tabs and post 46 relative to one another.

Means, such as rocker member 54, are provided for mounting spring 42 for movement from a normal position wherein blades 24 and 26 are biased into rest position by the spring. Rocker member 54 comprises two arms 56 and 58 set at an angle to one another, the rocker member being pivotally mounted by suitable bearing means 60 disposed at the juncture of the arms. Mounted adjacent the extremity of, for instance, arm 56 for movement therewith is a pivotal element such as pin 62. In order to pivotally mount spring 42 for movement, the spring is provided at the base of its U-shape with a turn or small circular section through which pin 62 slidingly extends substantially perpendicularly to the plane of the U. The locations of pin 62 upon the rocker member and of the rocker member upon plate 20 are such that rotation of the rocker member about bearing means 60 moves pin 62 along a predetermined path for moving spring 42 to its own plane substantially parallel to the planes of blades 24 and 26, and in a direction approximately perpendicular to a line from post 30 to the axis through exposure aperture 22. Thus, spring 42 not only serves to bias blades 24 and 26 into closed position, but also comprises a compliant linkage through which movement of rocker member 54 is transmitted to the blades for moving the latter from covering position. In the preferred embodiment, in order to provide freedom of movement to spring 42 so that it may function as a linkage, the spring is not rigidly anchored to the blades but is pivotally connected therewith, thus not restricting the pivotal movement of the blades about post 30 while the spring is moving approximately in translation. Also in the preferred embodiment the spacing of pin 62 from bearing means 60 relative to the distance from pin 62 to points 41 and 43 of attachment of the extremities of spring 42 to the blades, and the spacing of points 41 and 43 relative to post 30, all are such that the rotation of rocker member 54 moves spring 42 from its normal position to or through a displaced position wherein points 41 and 43 and post 30 all lie approximately along a straight line. In said displaced position, because the resilient bias of spring 42 is exerted upon the blades from approximately opposite sides of and toward post 30, there is little if any turning moment upon the blades due to spring 42.

As the blades, in accordance with the translational movement of the spring, rotate in opposite directions to one another from their rest position, the bias of spring 42 decreases and the blades frame an opening 40 and expose aperture 22. As a means for limiting the travel of the blades and for providing a covering movement to them, the invention includes a resilient reversing means, such as rebound member or bounce spring 64, adapted to be momentarily engageable with the blades for reversing the direction of movement thereof, thereby returning them to their rest position. It will be seen, as shown in Figs. 1 through 3, that blades 24 and 26 both include thereon, respectively, impact portions 66 and 68 which are located between the pivoted extremity and the covering portion of the respective blades. Impact portion 66 comprises a predeterminedly shaped edge extending approximately radially of the pivotal axis of blade 24; impact portion 68 likewise comprises a predeterminedly shaped edge extending approximately radially of the pivotal axis of blade 26. Viewing the blades at rest position from a point substantially normal to their planes of movement, both impact portions are disposed upon their respective blades adjacent but separated from one another by a gap or channel 70. Upon rotation of the blades oppositely to one another from their rest position, the impact portions will appear to intercept one another, the point of apparent interception varying along a predetermined path located in channel 70 according to the extent of the rotation of the blades, the path being along a line approximately perpendicular to the paths of movement of the blades. Bounce spring 64 is therefore preferably provided in the form of an elongated pin having its longitudinal axis extending approximately perpendicularly to the plane of movement of the blades and is disposed in channel 70 between impact portion 66 and impact portion 68 for movement along the predetermined path of the points of apparent interception of the impact portions. Upon rotation of the blades from their rest poistion, this disposition of bounce spring 64 provides for substantially simultaneous and momentary engagement of the bounce spring by the impact portions. Bounce spring 64 is preferably formed of an elastic material which, being resiliently deformable under impact, will absorb the kinetic energy of the blades and reverse the direction of motion of the blades, reimparting the kinetic energy to them for returning them to their rest position. Of course, during movement of the blades back to their rest position, because spring 42 is thereby moved back toward its normal position, the bias of spring 42 is reasserted to some extent and thus aids the return movement of the blades. Spring 42 is so mounted that this spring bias preferably reaches a maximum approximately at the point of engagement of tabs 50 and 52 with post 46, bouncing of the blades at the end of the exposure cycle being thereby alleviated.

The position taken by bounce spring 64 along the predetermined path of points of apparent interception of the impact portions therefore determines the extent of the rotation of the blades and consequently establishes both exposure time interval and effective exposure area. In the embodiment shown, it will be seen that, as the radial distance of the bounce spring increases from post 30, both the exposure time interval and the effective exposure area defined by opening 40 are decreased. Conversely, the closer the bounce spring is positioned to post 30, the longer becomes the exposure time interval and the greater is the effective area of the exposure aperture.

In the embodiment shown in FIGS. 1 and 2, in order to adapt the shutter for automatic exposure control, the shutter mechanism includes a photosensitive means which provides electrical signals in accordance with the intensity of light incident thereon, and also includes a means for translating the electrical signals into mechanical displacements. The photosensitive means comprises photocell 72, indicated schematically in broken lines, having a photosensitive surface which is preferably directed normally to the field of view intended to be viewed through aperture 22. The term "photocell" is intended herein to include photovoltaic and photoconductive devices; and where the latter type of device is employed, the term "photocell" is to be construed as including an electrical power source for energizing the cell if necessary. The photocell is preferably mounted on plate 20; however, the cell may be mounted elsewhere or may be releasably detachable from the mechanism.

As a means for translating the signals, there is provided a galvanometer indicated diagrammatically at 74 and electrically coupled with the photocell. The galvanometer includes the usual spring-biased, moving coil 76 rotatable in the magnetic field of a magnet. Mounted on the moving coil is an indicating means or pointer 78 which is rotatable with the coil in accordance with the intensity of light incident upon the photocell. In the embodiment shown, bounce spring 64 is mounted upon pointer 78 adjacent one extremity thereof, so that the galvanometer and associated pointer comprise a means for positioning the bounce spring in the manner hereinbefore described.

Inasmuch as the bounce spring is intended to be subject to impact forces of the moving blades, and in order to protect the usually delicate bearings of the galvanometer, pointer 78 is formed of a resilient, compliant material adapted to adsorb a substantial portion of any forces acting upon the reversing means which may tend to turn the latter from its position normally perpendicular to the plane of movement of the pointer. Because the shutter blades are so mounted upon post 30 that their movement is opposite to one another in different but substantially parallel planes, the approximately simultaneous impact of the blades occurs at points on bounce spring 64 which are not disposed oppositely to one another in the same plane, thereby creating a turning moment acting upon the bounce spring. A substantial portion of the turning moment is absorbed in the resilient flexing of the compliant pointer. However, in the preferred embodiment the blades are movable in planes which are as closely adjacent as possible commensurate with mechanical tolerances allowing of free movement, so this turning moment is kept very small. Also, because it is otherwise desirable to employ very lightweight blades, the total force exerted thereby, even at high speeds, is further minimized. In the event the blades do not engage the bounce spring with precise simultaneity and thus may inadvertently deflect the bounce spring to a position which does not accurately represent the photocell signal, the edge of one or both of the impact portions of the blades may be provided with a gripping surface such as the serrations formed, as shown in the drawings, on the edge of impact portion 68.

In the embodiments above described, the intensity of the light on the photocell is employed as the governing exposure parameter. It is, however, contemplated that the invention may include in the electrical circuit of the photocell and galvanometer variable impedances which are preadjustable to compensate the shutter mechanism for such additional factors as film speed and filter characteristics. Alternatively, the invention may include means for rotating the galvanometer as a whole about the coil axis for adjusting for film speed, etc. And, preferably, the edges of impact portions 66 and 68 are so shaped that the curve is matched to the combination of photocell and galvanometer characteristics to produce a "linear" shutter mechanism, i.e., one in which the exposure value (in terms of exposure time interval, effective area of exposure aperture, or both) is a linear function of the logarithm of the intensity of the light.

It is also within the scope of this invention to include an embodiment of the shutter similar to that hereinbefore described which, however, does not include the photocell and galvanometer but is instead provided with manual means for setting the position of the bounce spring. This latter embodiment would naturally be less expensive to construct and maintain, while yet possessing the wide range of exposure value and accurate timekeeping qualities obtainable by the invention.

As a means for initiating rotation of rocker member 54 about its bearing means, there is provided an impulse-delivering means such as kicker 80 which is shaped in the form of a star-wheel having a plurality of impulse-delivering portions such as evenly and predeterminedly spaced teeth 82 extending radially from a common pivotal center. Kicker 80 is mounted for rotation about its pivotal center upon suitable pivot means 83 mounted on plate 20. Kicker 80 is so disposed adjacent rocker member 54 that, during rotation of the kicker through a predetermined angle approximately equal to but not greater than the angle subtended by one of teeth 82, one of teeth 82 momentarily engages and then disengages engagement portion 84 of arm 58. As a means for imparting a rotational impulse to the kicker to move the latter through the above-mentioned predetermined angle, there is provided an elongated element such as lever 86 which has one extremity thereof independently mounted for rotation about pivot 83 coaxially with the kicker. In the form shown, the length of lever 86 from its pivoted to its unpivoted extremity is substantially greater than the maximum radius of the kicker; consequently, the unpivoted extremity of the lever extends radially beyond the locus of movement of the radial extremities of teeth 82 and comprises a movable means for pivotally mounting a member, such as pawl 88, adapted for releasable engagement with teeth 82. Resilient means such as spring 90 are provided for biasing pawl 88 into engagement with teeth 82, spring 90 being preferably shaped in the form of a coil spring anchored at its extremities, respectively, upon lever 86 and pawl 88. Lever 86 is pivotable between a first position as shown in FIG. 1 and a second position. In the first position, the pawl is resiliently biased into one of the depressions between two of teeth 82, a portion of the pawl being either so in engagement with or so movable into engagement with a side edge of one of teeth 82 adjacent the depression that motion of the lever from its first position to its second position rotates kicker 80. In the second position, the lever has moved through an angle such that the kicker has been rotated through its aforesaid predetermined angle by the engagement of the pawl and tooth. Means, such as limit post 92, are provided in the path of lever 86 for engagement therewith to arrest movement of the lever from its first position, thereby defining the second position. A flexible means such as leaf spring 94 is preferably mounted upon suitable mounting means, such as post 85 attached to plate 20, and is engageable with teeth 82 of the star-wheel for preventing rotary motion of the star-wheel in a direction opposite to the direction of motion of the star-wheel provided by the movement of the lever and pawl.

In order to provide the motive force for moving lever 86 from its first to its second position, there is provided a resilient means, such as main spring 96. In the preferred form, main spring 96 comprises a V-shaped resilient member having a fixed leg 97 and a movable leg 98. Leg 97 is firmly mounted upon plate 20 as by attachment of the extremity of leg 97 to an abutment 99 extending from plate 20 and by attachment of the apex of the main spring to post 100. The extremity of movable leg 98 is pivotally connected to lever 86 adjacent to the pivotal axis of pawl 88. It may be seen that, as a consequence of the mounting thereof, movable leg 98 is effectively a cantilever spring. In the form shown, when lever 86 is in its first position, leg 98 is under tension and tends to rotate the lever from its first to its second position.

For releasably retaining lever 86 in its first position, there is provided a latch means which, in the form shown, comprises bell crank 102 centrally mounted for rotation upon plate 20. Arm 103 of bell crank 102 includes a latch portion 104 thereon which, with rotation of the bell crank about its pivotal axis, is movable in and out of the path of movement of lever 86 for engaging the latter. The other arm 105 of bell crank 102 is in sliding engagement with a resilient means, such as leaf spring 106, for biasing latch portion 104 into engagement with lever 86. Spring 106 is mounted upon plate 20 by appropriate means such as post 108.

An actuating means is provided for initiating operation of the shutter and, in the form shown, comprises a means such as actuating crank 110 having two arm portions 112 and 114 extending at an angle to one another, crank 110 being pivotally mounted adjacent the junction of the two arms for movement about post 100 in the plane defined by the arms. Arm 112 preferably extends beyond the periphery of plate 20 so as to be manually engageable such that an operator of the mechanism may exert a rotational force thereupon. Means for resiliently biasing crank 110 into its rest or inoperative position are provided and, in the form shown, comprise coil spring 116 which is mounted at its respective extremities upon arm 114 as at point 118 and upon plate 20 as at abutment 99. Means, such as stop pin 120 mounted upon plate 20, is provided in the path of movement of arm 114 for defining the rotational limit of the actuating crank when under the bias of spring 116, thereby establishing the rest position of the actuating crank. Arm 114 also includes, adjacent its unpivoted extremity, means such as pin 122 which extends substantially perpendicularly to the plane of movement of the crank and which is releasably engageable with movable leg 98 of main spring 96 for tensioning the latter. Also included adjacent the extremity of arm 114 is contact portion 124 which is so disposed as to be releasably engageable with arm 105 of bell crank 102 during rotation of the actuating crank from its rest position. Means are provided for limiting the rotation of the actuating crank from its rest position and, in the form shown, comprise mounting post 108.

In operation, manual pressure applied by an operator upon arm 112 of actuating crank 110 rotates the latter from its rest position against the bias of spring 116 toward engagement with post 108. This rotation of the actuating crank moves pin 122 out of engagement with main spring 96, and moves contact portion 124 into engagement with arm 105 of bell crank 102. The force exerted by contact portion 124 bearing upon arm 105 overcomes the bias imposed upon the bell crank by leaf spring 106, thereby rotating the bell crank so that latch portion 104 is moved out of the path of movement of lever 86 and disengages from the latter. Lever 86, now being freed of restraint, rotates rapidly under the impetus of main spring 96 until arrested by engagement with post 92. The rapid rotation of lever 86, by virtue of the coupling provided by pawl 88, moves kicker 80 rapidly through a predetermined angular rotation during which one of teeth 82 sequentially engages and disengages engagement portion 84 causing rocker member 54 to rotate about bearing means 60. As hereinbefore described, the rotation of the rocker member effects movement of spring 42 and the shutter blades at a blade velocity which is substantially the same for each successive engagement of the rocker member by teeth 82 for momentarily exposing aperture 22.

Upon the release of arm 112 by the operator, actuating crank 110 rotates toward its rest position under the bias of spring 116. During this rotation, pin 122 reengages leg 98 of spring 96. Because, in the preferred form, spring 116 is of substantially greater strength than spring 96, the rotation of pin 122 in engagement with spring 96 continues until the movement of the actuating crank is arrested by contact with stop pin 120, thereby tensioning spring 96 and moving attached lever 86 to its first position. During the movement of lever 86 from its second to its first position, pawl 88 is rotated about its pivotal axis against the bias of spring 90 by movement across the apex of one of teeth 82. As lever 86 returns to its first position and pawl 88 clears the apex of the tooth, spring 90 rotates the pawl into a depression between two of teeth 82 such that the pawl is again in a position to impart rotary movement to kicker 80. During the movement of lever 86 from second to first position, spring 94 effectively engages one of teeth 82 so as to prevent retrograde movement of the kicker because of frictional engagement with the pawl. During the movement of the actuating crank to its rest position, the force exerted by contact portion 124 upon arm 105 of bell crank 102 is released, thereby allowing leaf spring 106 to reassert its bias for repositioning latch portion 104 in the path of movement of lever 86. As lever 86 returns to its first position, it is therefor reengaged by latch portion 104 and the mechanism is ready for another exposure cycle upon manipulation of the actuating crank by an operator.

It will be seen that the galvanometer structure includes a limit stop 130 against which pointer 78 rests under the bias of the usual galvanometer hair spring when no more than a predetermined minimum current flows through coil 76. This "zero" position of pointer 78 against stop 130, as hereinbefore disclosed, then represents a plurality of levels of light intensity, none of which is large enough to produce a signal having a current in excess of the predetermined minimum. In the preferred embodiment, for example by the known technique of adjusting hairspring tension, the "zero" position of pointer 78 is so established that the minimum current necessary to cause rotation of the coil from stop 130 is due to the smallest acceptable light level for effecting exposure of film in a camera with which this invention may be associated.

Figure 4:
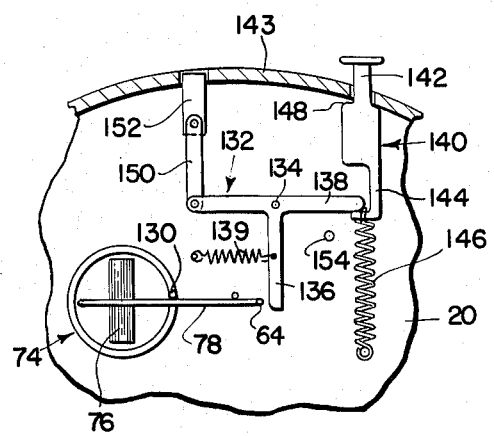
FIG. 4 is a schematic view of an indicating mechanism which may be included in an embodiment of the invention as shown in FIGURE 1.

As a means for determining whether or not pointer 78 is in the "zero" position and consequently indicating whether or not the ambient light level is sufficient to effect exposure, the invention includes a visual and tactical indicating mechanism schematically shown in FIG. 4. The indicating mechanism includes a sensory member such as T-shaped crank 132 which is mounted upon plate 20 for rotation about suitable pivot means 134 located at the intersection of the base element 136 and cross-element 138 of crank 132. Crank 132 is so disposed that the path of movement of the unpivoted extremity of base element 136 intersects bounce spring 64 when pointer 78 is in the "zero" position. Resilient means such as tension spring 139, which is anchored at its extremities, respectively, to plate 20 and upon a medial portion of base element 136, is provided for biasing crank 132 so that when the galvanometer pointer is in "zero" position base element 136 is engageable with bounce spring 64. In order to releasably restrain crank 132 from rotation, there is provided a latch element comprising manually engageable, elongated element 140. Element 140 includes at one extremity thereof a button portion 142 which extends beyond peripheral limit or flange 143 of plate 20. The other extremity of elongated element 140 comprises a recessed latch portion 144 into which one end of cross-element 138 extends. Resilient means such as coil spring 146 is so connected with both plate 20 and element 140 as to bias element 140 outwardly beyond the limit of the plate. Button portion 142 is provided with a shoulder 148 engageable with plate 20 so as to provide a limit stop for the outward movement of element 140. It will be seen that latch portion 144 is so dimensioned with respect to the end of cross-element 138 inserted therein as to provide a limit stop for the rotation of crank 132 under the bias of spring 139. The opposite end of cross-element 138 is provided with a link member 150 pivotally mounted thereon, the link member being in turn pivotally connected to one end of an elongated indicating element 152.

In operation, engagement of button portion 142 by an operator forces element 140 against the bias of spring 146, moving latch portion 144 and thus freeing T-shaped crank 132 for rotation under the bias of spring 139. If the level of light intensity is insufficient to have caused movement of pointer 78 out of its "zero" position, then base element 136 engages bounce spring 64, and the rotation of crank 132 is arrested. Indicating element 152 is so dimensioned that, when base element 136 and bounce spring 64 are in engagement, the unpivoted extremity of indicating element 152 does not extend beyond margin 143 of plate 20. Hence under the latter circumstances, plate 20 may be formed so that the indicating element remains substantially hidden.

If, however, the level of light intensity has been sufficient to move pointer 78 out of its "zero" position, bounce spring 64 no longer impedes base element 136 and crank 132 continues to rotate until arrested, as by a stop device such as pin 154. Link member 150 and indicating element 152 are so mounted with respect to cross-element 138 that when the rotation of crank 132 is thus arrested the unpivoted extremity of indicating element 152 extends a substantial distance beyond margin 143 of plate 20.

Indicating element 152 preferably is brightly colored in contrast to its background so as to be readily visible upon extension beyond margin 143, thus indicating that adequate light exists for proper exposure.

Upon release of button portion 142 by an operator, the return movement of elongated element 140 under the impetus of spring 146 causes latch portion 144 to re-engage cross-element 138, thus rotating crank 132 and withdrawing linked indicating element 152 from its extended position. Because the return movement of element 140 rotates crank 132 against the bias of spring 139, it will be seen that, in the form shown, spring 146 is substantially stronger than spring 139.

Although this simple mechanical sensing and indicating mechanism has been shown in the preferred embodiment, it is understood that the invention is not limited to only this type of indicating mechanism.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An exposure control mechanism for photographic apparatus, said mechanism comprising, in combination, means providing an exposure aperture, shutter means mounted adjacent said exposure aperture for movement between covering position and uncovering positions with respect to said aperture to effect exposures therethrough, a first resilient means connected to said shutter means for biasing the latter into covering position, means for so moving said first resilient means as to transmit through the latter a movement to displace said shutter means from said covering position, and second resilient means variably positionable in the path of movement of at least a portion of said shutter means from said covering position for so intercepting and reversing the direction of movement thereof that said shutter means are returned to said covering position.

2. An exposure control mechanism as defined in claim 1, including a photoelectric means for establishing electrical signals in accordance with the intensity of light incident thereon, and means electrically coupled with said photoelectric means and mechanically coupled with said second resilient means for variably positioning the latter responsively to said signals.

3. An exposure control mechanism as defined in claim 1, wherein said means for moving said first resilient means comprises movable support means for mounting said first resilient means, impulse-delivering means mounted for movement into momentary engagement with a portion of said movable support means for moving the latter, means for moving said impulse-delivering means, and actuating means for initiating operation of said means for moving said first resilient means.

4. An exposure control mechanism as defined in claim 1, wherein said means for moving said first resilient means comprises a lever pivotally mounted at an intermediate portion thereof and connected at one extremity thereof to said first resilient means, an impulse-delivering means having a plurality of impulse-delivering portions and mounted for rotation so that each of said portions is successively momentarily engageable with a portion of the other extremity of said lever for pivoting the latter, a movable member engageable with at least one of said impulse-delivering portions for imparting a rotational impulse to said impulse-delivering means, spring means for providing the force for moving said member to impart said impulse, latch means for releasably retaining said member in a position wherein said spring means are tensioned, and manually manipulable actuating means for moving said latch means to release said member for movement under the force supplied by said spring means.

5. An exposure control mechanism for photographic apparatus, said mechanism comprising, in combination, means providing an exposure aperture, a plurality of shutter blades mounted for movement between covering and uncovering positions with respect to said aperture, means connected to each of said blades for biasing the latter into said covering position, means for so moving said biasing means as to impart therethrough substantially simultaneous uncovering movements to each of said blades, and means disposed in the paths of movement of said blades for substantially simultaneously intercepting said blades and for so reversing the direction of uncovering movement thereof as to return said blades to said covering position.

6. An exposure control mechanism for photographic apparatus, said mechanism comprising, in combination, means providing an exposure aperture, shutter means mounted for movement between covering and uncovering positions with respect to said aperture, a first resilient means for exerting force upon said shutter means in a predetermined direction for biasing said shutter means into said covering position, means connected to said shutter means through said first resilient means for displacing said shutter means from said covering position by moving said first resilient means in a second direction, and second resilient means variably positionable in the path of movement of at least a portion of said shutter means for intercepting the latter during displacement from said covering position and for reversing the direction of movement of said shutter means.

7. An exposure control mechanism for photographic apparatus, said mechanism comprising, in combination, means providing an exposure aperture, shutter means mounted for movement between covering and uncovering positions with respect to said aperture, spring means for exerting force upon said shutter means in a predetermined direction for biasing said shutter means into said covering position, means for moving said spring means in a direction approximately normal to said predetermined direction for imparting through said spring means a movement for displacing said shutter means from said covering position, and a rebound member variably positionable in the path of movement of at least a portion of said shutter means for intercepting the latter during displacement from said covering position and for so reversing the direction of movement of said shutter means as to return the latter to said covering position.

8. An exposure control mechanism for photographic apparatus, said mechanism comprising, in combination, means providing an exposure aperture, a plurality of shutter blades mounted for movement between covering and uncovering positions with respect to said aperture for effecting exposure, the time interval of said exposure being a function of the total travel of said blades, said blades being shaped for defining in cooperation with said exposure aperture a variable effective exposure aperture the area of which is a function of said total travel, means connected to each of said blades for biasing the latter into said covering position, means for so moving said biasing means as to impart therethrough movement to displace each of said blades from said covering position, and means variably positionable in the paths of movement of said blades for intercepting the latter to define said uncovering positions and for so reversing the direction of movement of said blades as to return them to said covering position.

9. An exposure control mechanism for photographic apparatus, said mechanism comprising, in combination, means providing an exposure aperture, at least two shutter blades, means for pivotally mounting said blades for movement in planes substantially adjacent and parallel to one another in opposite directions between covering and uncovering positions relative to said aperture, a first resilient element connected to each of said blades for biasing said blades for rotation about said mounting means into said covering position, movable means for mounting said first resilient element for at least a partially translatory movement, said first resilient element comprising a compliant linkage between said movable means and said blades for imparting movement of said movable means to said blades so as to rotate said blades from said covering position, a second resilient element variably positionable in the paths of rotation of said blades for substantially simultaneously engaging said blades for reversing the directions of movement of said blades thereby returning said blades to said covering position.

10. An exposure control device as defined in claim 9, including photosensitive means for producing electrical signals in accordance with light incident thereon, and a galvanometer means electrically coupled with said photosensitive means for variably positioning said second resilient element responsively to said signals.

11. An exposure control mechanism for photographic apparatus, said mechanism comprising, in combination, means providing an exposure aperture, at least two shutter blades mounted adjacent said exposure aperture for movement in adjacent and substantially parallel planes oppositely to one another between covering position and uncovering positions relative to said aperture to effect exposures therethrough, first resilient means connected to said blades for biasing them into covering position, means for so moving said first resilient means as to impart through the latter a movement for displacing said shutter blades from said covering position, photosensitive means for producing electrical signals in accordance with light incident thereon, means electrically coupled with said photosensitive means and having a portion thereof movable responsively to said signals in a plane adjacent and substantially parallel to the planes of movement of said blades, an elongated, resilient element mounted on said portion and extending substantially perpendicular to the plane of movement thereof, said resilient element being movable with said portion and so extending into the planes of movement of said blades as to be substantially simultaneously engageable with said blades for reversing the direction of displacing movement thereof so that said shutter blades are returned to said covering position.

12. An exposure control mechanism for photographic apparatus, said mechanism comprising, in combination, housing means including an exposure aperture, a plurality of shutter blades mounted upon said housing means for movement between covering position and uncovering positions with respect to said aperture, spring means connected to said blades for biasing them into said covering position, movable means for mounting said spring means, and means for moving said movable means, said spring means comprising a compliant linkage between said movable means and said blades for transmitting the movement of said mounting means to said blades so as to substantially simultaneously move said blades from said covering position, and means for substantially simultaneously returning said blades to said covering position following a predetermined time interval.

13. An exposure control mechanism as defined in claim 12, wherein said means for returning said blades comprises a single rebound member variably positionable in the paths of movement of said blades from said covering position for engaging said blades and reversing the directions of the movement of said blades.

14. An exposure control mechanism as defined in claim 13, wherein said shutter blades are shaped for defining in cooperation with said exposure aperture a variable effective exposure aperture the dimensions of which are a function of the position of said rebound member upon engagement of the latter with said blades.

15. An exposure control mechanism for photographic apparatus, said mechanism comprising, in combination, means providing an exposure aperture, a pair of shutter blades, means for mounting said shutter blades for rotation oppositely to one another about a common axis to and from a position wherein said blades cooperate to cover said aperture, a resilient element connected to one of said blades on one side of said axis and to the other of said blades approximately on the other side of said axis for biasing said blades into said covering position, the bias imposed by said resilient element being substantially at a maximum when said blades are in said covering position, movable means for mounting said resilient element, means for imparting a momentary movement to said movable means, said resilient element comprising a compliant linkage between said movable means and said blades for moving said blades substantially simultaneously from said covering position, said resilient element being so constructed and arranged that said bias varies as a function of the travel of said blades from said covering position, and means for returning said blades substantially simultaneously to said covering position following a predetermined time interval.

16. An exposure control mechanism as defined in claim 15, wherein said means for returning said shutter blades includes a resilient rebound member and means for variably positioning said rebound member in the paths of movement of said blades.

17. An exposure control mechanism as defined in claim 15, wherein said blades rotate in substantially adjacent planes, and said means for returning said shutter blades includes a photocell for producing electrical signals in accordance with the intensity of ambient illumination, a galvanometer electrically coupled with said photocell, said galvanometer having an indicating member movable approximately in a plane substantially parallel to and adjacent the planes of movement of said blades through a plurality of positions responsively to said signals, and a bounce spring mounted upon said indicating member and extending into the paths of movement of said blades for substantially simultaneously intercepting said blades so that the total travel of said blades is a function of said intensity.

References Cited by the Examiner

UNITED STATES PATENTS

| | | | |
|---|---|---|---|
| 2,187,953 | 1/1940 | Schmidt | 95—62 |
| 2,260,120 | 10/1941 | Mayer | 95—62 |
| 2,325,463 | 7/1943 | Axler | 95—10 |
| 2,356,455 | 8/1944 | Fuerst | 95—62 |
| 2,531,936 | 11/1950 | Fairbank et al. | 95—59 |
| 2,780,971 | 2/1957 | Fahlenberg | 95—10 |
| 2,887,025 | 5/1959 | Rentschler | 95—10 |
| 2,890,640 | 6/1959 | Noack | 95—63 |
| 2,900,888 | 8/1959 | Burger | 95—63 |
| 2,906,166 | 9/1959 | Herterich | 95—10 |
| 2,928,323 | 3/1960 | Steisslinger | 95—10 |
| 2,952,198 | 9/1960 | Fuerst | 95—62 |

FOREIGN PATENTS 1,193,034  4/1959  France.

NORTON ANSHER, *Primary Examiner.*

D. B. LOWE, E. E. FULLER, E. G. ANDERSON,
*Examiners.*